(12) United States Patent
Hieda

(10) Patent No.: US 6,445,824 B2
(45) Date of Patent: Sep. 3, 2002

(54) DATA TRANSMISSION WITH RECEIVER SIDE CONTROL

(75) Inventor: Teruo Hieda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/064,125

(22) Filed: Apr. 22, 1998

(30) Foreign Application Priority Data

Apr. 25, 1997 (JP) .............................................. 9-109683

(51) Int. Cl.[7] ................................................. G06K 9/36
(52) U.S. Cl. ...................................................... 382/232
(58) Field of Search ................................. 382/232, 236, 382/238, 239, 240; 348/384, 14, 552, 571, 405, 408, 412, 415, 419, 423, 430, 431, 439

(56) References Cited

U.S. PATENT DOCUMENTS

| | | | | |
|---|---|---|---|---|
| 4,969,204 A | * | 11/1990 | Melnychuck et al. | 382/232 |
| 5,144,424 A | * | 9/1992 | Savatier | 348/405 |
| 5,192,999 A | * | 3/1993 | Graczyk et al. | 348/552 |
| 5,283,638 A | * | 2/1994 | Engberg et al. | 348/14 |
| 5,283,819 A | * | 2/1994 | Glick et al. | 348/14 |
| 5,510,842 A | * | 4/1996 | Phillips et al. | 348/426 |
| 5,568,570 A | * | 10/1996 | Rabbani | 382/238 |
| 5,579,471 A | * | 11/1996 | Barber et al. | 395/326 |
| 5,608,862 A | * | 3/1997 | Enokida | 395/501 |
| 5,623,312 A | * | 4/1997 | Yan et al. | 348/416 |
| 5,629,736 A | * | 5/1997 | Haskell et al. | 348/387 |
| 5,682,441 A | * | 10/1997 | Lightenberg et al. | 382/232 |
| 5,748,789 A | * | 5/1998 | Lee et al. | 382/243 |
| 5,828,788 A | * | 10/1998 | Chiang et al. | 382/239 |
| RE36,145 E | * | 3/1999 | De Aguiar et al. | 345/311 |
| 5,881,176 A | * | 3/1999 | Keith et al. | 382/248 |
| 5,982,916 A | * | 11/1999 | Kuhn | 382/132 |
| 5,988,862 A | * | 11/1999 | Kacyra et al. | 364/578 |
| 6,041,143 A | * | 3/2000 | Chui et al. | 382/232 |
| 6,067,384 A | * | 5/2000 | Mankkam et al. | 382/250 |
| 6,084,978 A | * | 7/2000 | Taylor et al. | 382/154 |

* cited by examiner

Primary Examiner—Jose L. Couso
(74) Attorney, Agent, or Firm—Fitzpatrick, Cella, Harper & Scinto

(57) ABSTRACT

This invention provides communication method, communication device, transmitting device, receiving device, communication system, and memory medium which can take high quality pictures and communicate efficiently. According to one aspect, this invention is a communication method for supplying moving picture data sent from a transmitter to a receiver side through a transmission channel, characterized by the transmitter sends moving picture data of a predetermined resolution and/or frame rate based on an instruction from the receiver.

46 Claims, 6 Drawing Sheets

DATA TRANSMISSION WITH RECEIVER SIDE CONTROL

BACKGROUND OF THE INVENTION

1. Field of the Invention

This invention relates to communication method, communication apparatus, transmitting apparatus, receiving apparatus, communication system, and memory medium. For example, this invention relates to communicating moving picture data through a transmission channel.

2. Description of the Related Art

In recent years, with the spread of personal computers, the use of network, internet and modem communications has increased dramatically, for transmitting various kinds of information.

For example, it is possible for pictures obtained by video-cameras to be supplied to personal computers and stored as moving picture data. Further, making use of communication software, the moving picture data may be sent to other personal computers and host computers through a network, such as Ethernet or other transmission channel such as by modems.

There are difficulties, however, when the above-mentioned image data is transmitted by known communication methods.

First, a bit rate of transmission is very high when moving picture is sent from video-cameras to personal computers, owing to the large amount of data for moving pictures.

For example, consider a case where a single frame of a moving picture has 640 pixels in a horizontal direction and 480 pixels in a vertical direction and has 8 bits for each of R, G, B. If the moving picture is transmitted at the rate of 30 frames per second, the transmission bit rate is 640×480×30×3×8=221184000 bit. That is about 220M bit/s.

When a moving picture data of such a high bit rate is transmitted, the loads at the sender side, the transmission channel, and the receiver side become very large. Therefore, in the prior art, when moving picture data is transmitted, transmission capability (bandwidth) of the transmission channel is monopolized by the transmission. Then the number of communications which can occur over the channel at the same time decreases. Other communications are also impeded.

Also, at the receiver side, the personal computer uses most of its capabilities in order to receive the moving picture data, and can not conduct other calculations. Particularly, in order to confirm the received moving picture data, sometimes it is reduced and displayed. According to the prior art, even for confirmation by display on a monitor, the whole moving picture data is transmitted and the load of the receiver side remains heavy.

In order to solve the above-mentioned problem, there are known communication methods which compress the picture, reduce the resolution and/or reduce the frame rate. However, according to these methods, if the received picture is enlarged for display at the receiver side, the picture quality is not good.

SUMMARY OF THE INVENTION

Therefore, this invention was made in order to address the above-mentioned shortcomings, and its purpose is to provide communication method, communication device, transmitting device, receiving device, communication system, and memory medium which can take high quality pictures and communicate efficiently.

Especially, it is an object of the present invention to provide an efficient transmission of moving picture data.

In one aspect, the present invention involves communication in which moving picture data is sent from a transmitter to a receiver side through a transmission channel, characterized by the transmitter side sending the moving picture data at a resolution and/or frame rate determined based on an instruction from the receiver side. Preferably, the image data is arranged hierarchically, and is transmitted at a level in the hierarchy determined based on the instruction.

More concretely, the communication between a transmitter side which produces digital moving picture data and a receiving side which receives digital moving picture data through a transmission channel and displays an image based on the data, involves notification of the resolution or frame rate, which is set at the receiving side, to the transmitter side; and supply of the moving picture data to the receiver side by the transmitter side. The resolution and frame rate of the moving picture data is obtained from hierarchically arranged image data based on the notification. Preferably, the transmitter side transmits a part of the hierarchical moving picture data which includes a layer corresponding to the notification instruction from said receiver side. The receiver side may instruct either the resolution or frame rate, or both, to the transmitter side. The transmitter side transmits the moving picture data obtained from an object. The transmitter side may also transmit moving picture data of a kind selected from among plural kinds based on the instruction from the receiver side. At the receiver side, an image is displayed based on the moving picture data from the transmitter side.

In another aspect, the present invention involves communication of moving picture data sent from a transmitter to a receiver side through a transmission channel, characterized by the transmitter side sending the moving picture data at a frame rate determined based on an instruction from the receiver side.

More concretely, the communication between a transmitter side which produces digital moving picture data and a receiving side which receives digital moving picture data through a transmission channel and displays an image based on the data, involves notification of the frame rate, which is set at said receiving side, to the transmitter side; and supply of the moving picture data to the receiver side by the transmitter side. The frame rate of the moving picture data is obtained based on the notification. The moving picture data is preferably arranged hierarchically. Preferably, the transmitter side transmits a part of the hierarchical moving picture data which includes a layer corresponding to the notification instruction from the receiver side. The receiver side may instruct either the resolution or frame rate, or both, to the transmitter side. The transmitter side transmits the moving picture data obtained from an object. The transmitter side may also transmit a sequence of the moving picture data whose identity is selected from among plural different sequences based on the instruction from the receiver side. At the receiver side an image is displayed based on the moving picture data from the transmitter side.

The present invention can be applied to a transmitter side only and also a receiver side only.

This summary has been provided so that the nature of the invention may be understood quickly. A more complete understanding of the invention can be obtained by reference to the followed detailed description of the preferred embodiments thereof in connection with the attached Figures.

DETAILED DESCRIPTION OF THE PREFERRED EMBODIMENTS

First Embodiment

Figure 1:
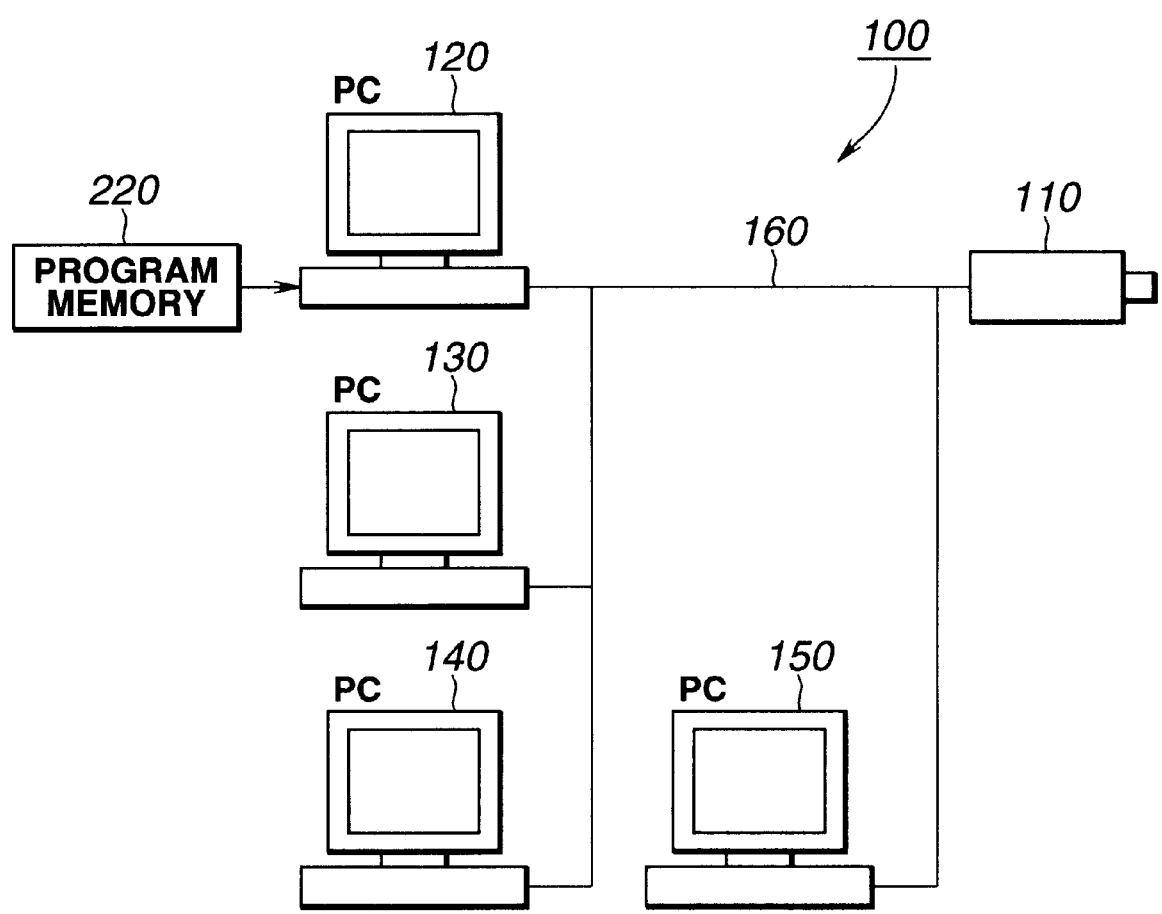
FIG. 1 shows a block diagram of the structure of a communication system according to one embodiment of the present invention.

FIG. 1 shows a communication system 100 embodying the present invention.

Communication system 100 includes a sending apparatus comprised by video-camera 110 having a network communication function. Four personal computers 120, 130, 140, 150 each having a network communication function are receiving apparatuses. Video-camera 110 and four personal computers 120, 130, 140, 150 are connected to each other by network 160 which constitutes a transmission channel.

Figure 2:
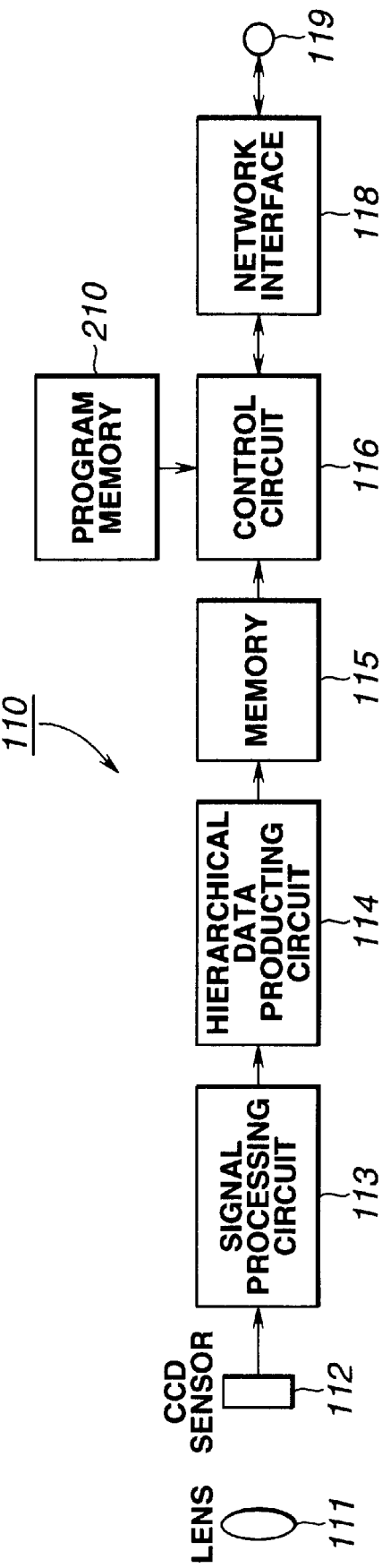
FIG. 2 shows a block diagram of the structure of a video-camera included in the communication system.

FIG. 2 is a block diagram showing the construction of video camera 110. As shown in FIG. 2, video-camera 110 includes lens 111, which is part of an optical system for image capture, image capturing device 112, to which the light from lens 111 is focused, signal processing circuit 113, to which the output of image capturing device 112 is supplied, hierarchical data producing circuit 114, to which the output of signal processing circuit 113 is supplied, memory 115, to which the output of hierarchical data producing circuit 114 is supplied, control circuit 116, to which the output of memory 115 is supplied, network interface circuit 118, which is connected to control circuit 116, and network connecting terminal 119, which is connected to network interface circuit 118. Video-camera 110 is connected to network 160 in FIG. 1 via connecting terminal 119.

Each computer 120~150 has a different function, for example, different data process ability, different display resolution or different image display ability.

First, a sequence of operation of communication system 100 will be explained as follows.

In video-camera 110, a light from an object, not shown in the figure, is focused to image capturing device 112 through lens 111. Image capturing device 112 comprises, for example, a CCD (charge coupled device), which generates video signals by photo-electrically converting the light from lens 111 and supplies the video signals to signal processing circuit 113. Signal processing circuit 113 performs a predetermined process on the video signals from image capturing device 112, generates moving picture signals and supplies the moving picture signals to hierarchical data producing circuit 114. Hierarchical data producing circuit 114 converts the moving picture signals from signal processing circuit 113 into image data hierarchically structured both in pixel number dimension and in time-axis dimension (herein after "hierarchical data"). The image data is temporarily stored in memory 115. Control circuit 116 communicates with each computer 120~150, which is connected to network 160, through network interface circuit 118 and network connecting terminal 119 by using commands.

Further, control circuit 116 sends the image data stored in memory 115 to each computer 120~150 through network interface circuit 118 and network connecting terminal 119. In this case, control circuit 116 does not send all image data stored in memory 115, but only a part of the image data, which corresponds to the requested resolution and frame rate, based on the commands from each computer 120~150. Accordingly, the image data, which corresponds to the requested resolution and frame rate, is supplied to each computer 120~150 based on the commands from them through network 160.

Computer 120~150 stores the supplied image data or displays an image based on the image data.

Next, the hierarchical data, which is generated by hierarchical data producing circuit 114 and stored in memory 115, will be explained in detail.

Figure 3:
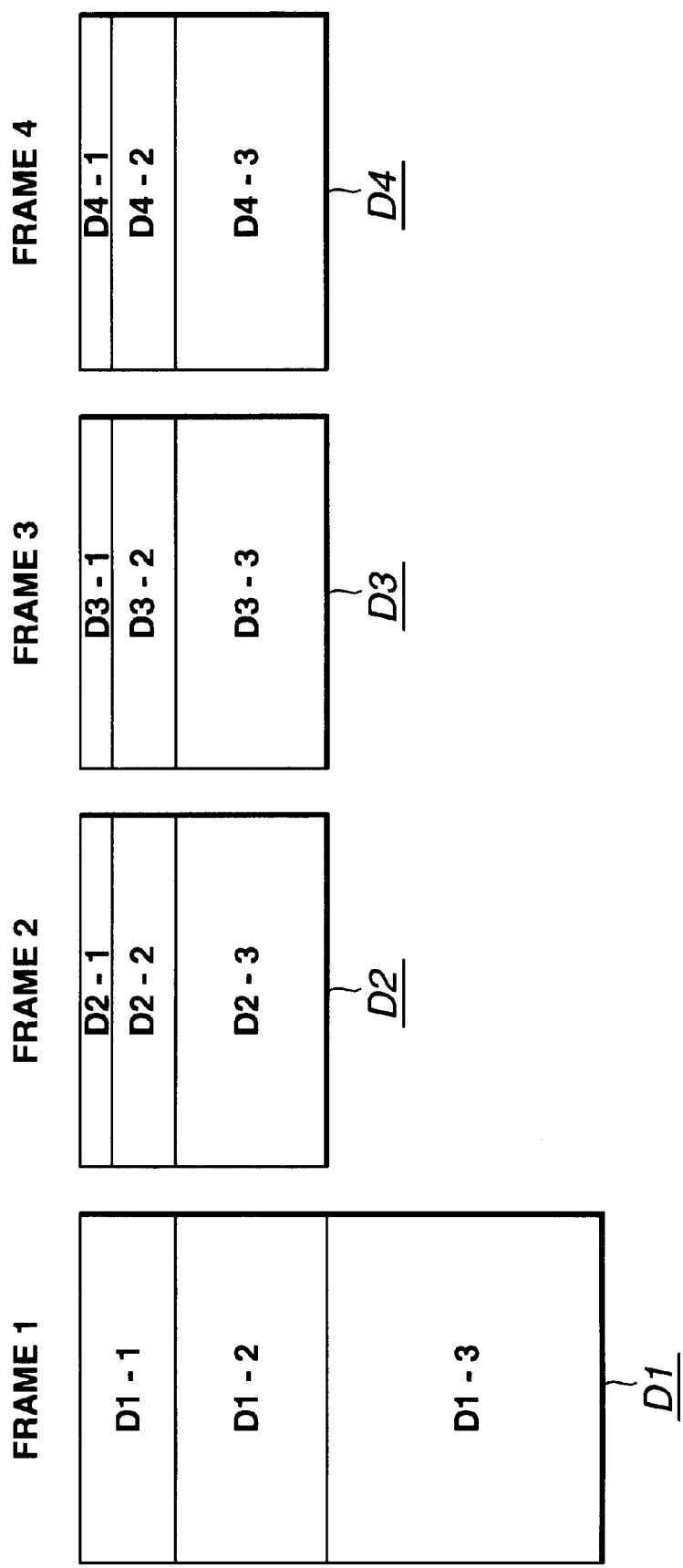
FIG. 3 shows one example of hierarchical data produced by a hierarchical data producing circuit included in the communication system.

Consider four frames (frame 1 to 4) of moving picture signals supplied to hierarchical data producing circuit 114 from signal processing circuit 113. Hierarchical data producing circuit 114 produces, from the supplied moving picture signals of four frames, digital image data D1 (composed of data D1-1, D1-2, D1-3), digital image data D2 (composed of data D2-1, D2-2, D2-3), digital image data D3 (composed of data D3-1, D3-2, D3-3), and digital image data D4 (composed of data D4-1, D4-2, D4-3) as shown in FIG. 3.

Image data D1 represents frame 1, which may be a starting frame or reset frame of the moving picture. Image data D2 represents frame 2, which is a next successive frame of frame 1. Image data D3 represents frame 3, which is a next successive frame of frame 2. Image data D4 represents frame 4, which is a next successive frame of frame 3.

Image data D1 includes the entirety of information of frame 1, in compressed or uncompressed format. However, image data D2 only includes information of the difference between frame 1 and frame 2. Likewise, image data D3 only includes information of the difference between frame 2 and frame 3, and image data D4 only includes information of the difference between frame 3 and frame 4.

In image data D1, data D1-1 represents the lowest resolution image, which includes least number of pixels. Data D1-2 represents a middle resolution image, and is stored as difference data between data D1-1 and data representing a middle resolution image which includes more pixels than the lowest resolution image. The difference data is obtained by removing data D1-1 from the data representing the middle image. Data D1-3 represents a higher resolution image, and is stored as difference data which is obtained by removing the data D1-1 and D1-2 from data representing a higher resolution image which includes more pixels than the middle resolution image.

Image data D2~D4, as well as image data D1, respectively include three resolution image data, such as data Dx-1, Dx-2, Dx-3. The hierarchical image data D1~D4 are stored in memory 115.

In this embodiment, there are three layers of resolutions. However, the number of layers is not limited to three. It can be determined in accordance with the process ability or necessity of the system. Preferably, it is within 2 layers~10 layers. For example, in a case where the lowest resolution is 16 pixel×16 pixel, which is usually used for an icon display by a personal computer, the other resolutions can be 80 pixel×60 pixel, 160 pixel×120 pixel, 240 pixel×180 pixel, 320 pixel×240 pixel, 640 pixel×480 pixel.

In this example, the number of frames is four (frame 1~frame 4) and the hierarchical image data to be produced are D1~D4. However, the number of frames are not limited to this embodiment. It can be determined in accordance with the process ability or necessity of the system. Preferably, it is within 4 frames~30 frames per second. In that case, even if the number of frames are different, the structure of data representing whole one frame is similar to D1-1, D1-2, D1-3. Difference data which is similar to D2-1, D2-2, D2-3 succeeds D1-1, D1-2, D1-3. Difference data Dn-1, Dn-2, Dn-3 (n: maximum frame number) succeeds D2-1, D2-2, D2-3.

Next, the operational timing of video-camera and computer 120~150 will be explained in detail.

A memory medium comprised by a program memory is provided for each of computers 120~150, one of which is shown at 220 in FIG. 1 for computer 120, to store a communication program. Each computer is arranged to communicate with video-camera 110 by reading-out the communication program from its respective program memory and executing it.

Likewise, program memory 210 is connected to control circuit 116 and is included in video-camera 110 as shown in FIG. 2. Control circuit 116 is arranged to communicate with video-camera 110 and computers 120~150 by reading-out the communication program from program memory 210 and executing it.

Process steps executed by the communication program executed in video-camera 110 are shown in FIG. 4(a). Process steps executed by the communication programs executed in computers 120~150 are shown in FIG. 4(b).

In this embodiment, program memory 210 is provided inside of video-camera 110. However, it can be connected from outside as an external memory apparatus. Likewise, program memory 220 can be located inside or outside of computer 120.

Figure 4:
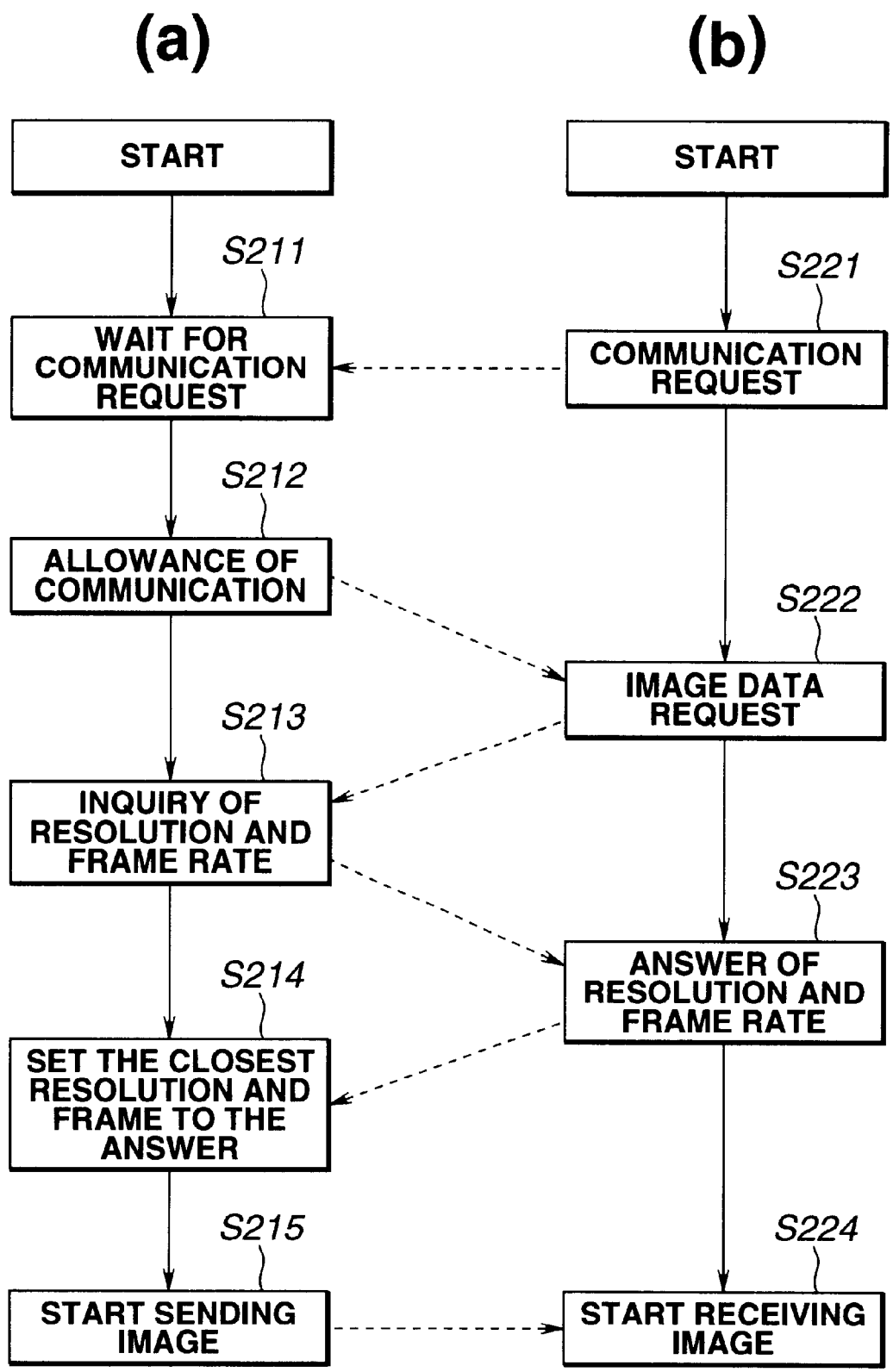
FIG. 4 is a flow-chart for explaining the operation of the communication system.

In FIG. 4, a solid line expresses a flow of control, and a dotted line expresses a flow of commands and data in network 160.

Briefly, the process steps in FIG. 4 for computer 120 operate to send an instruction to video-camera 110 concerning resolution and/or frame rate of the moving picture data and to receive the moving picture data from video-camera at a resolution and/or frame rate based on the instruction. For video-camera 110, the process steps operate to receive an instruction from computer 120 concerning resolution and/or frame rate of the moving picture data and to send the moving picture data to computer 120 at a resolution and/or frame rate based on the instruction from computer 120. Overall, the process operate to receive an instruction at the transmitter from the receiver concerning resolution and/or frame rate of the moving picture data to send the moving picture data from the transmitter to the receiver at a resolution and/or frame rate based on the instruction from the receiver.

In more detail, in step S211, video-camera 110 waits for a communication request. Flow remains at step S211 until control circuit 102 receives the communication request.

In step S221, one of the computers, for example, computer 120, sends a communication request through network 160 to video-camera 110. Control circuit 116 in video-camera 110 responds in step S212 by sending an allowance of communication through network 160 to computer 120.

Upon receipt of the allowance of communication message from video-camera 110, computer 120 sends an image data request through network 160 to video-camera 110 (step S222).

Next, control circuit 116 in video-camera 110 sends an inquiry of resolution and frame rate through network 160 to computer 120 in response to the image data request (step S213). Computer 120 responds by sending its desire for frame rate and resolution through network 160 to video-camera 110 (step S223).

Computer 120 can obtain its desire for frame rate and resolution automatically such as with default values, but more preferably, the frame rate and/or resolution are obtained manually, with operator interaction. For example, computer 120 can display a message for instructing a user to input information such as a size of a display area, setting values in response to the inquiry from video-camera 110. In response to the message, the user can input information such as the size of the display area, setting values by operating a mouse or a key board. For example, a size of the display area for displaying moving pictures can be input. Computer 120 sends the answer for the resolution and the frame rate through network 160 to video-camera 110 based on the operation of the user.

Next, control circuit 116 in video-camera 110 sets the nearest resolution and frame rate to the answer from computer 120 (step S214). Concretely, for example, values of a plurality of combinations of resolutions and frame rates are stored in memory 115 in advance, in correspondence with the hierarchical data shown in FIG. 3. Accordingly, control circuit 116 selects and sets the setting values of the nearest resolution and frame rate to the answer from computer 120 from among the plurality of combinations.

Control circuit 116 reads out only the image data corresponding to the set resolution and frame rate from among the image data stored in memory 115 and sends it through network 160 to computer 120 (step S215). Accordingly, computer 120 receives the image data sent by video-camera 110 and displays an image based on the received image data (step S224).

In this example, interaction between only video-camera 110 and computer 120 was explained. Of course, other computers 130~150 can communicate with video-camera 110 in the same way. When a communication request is sent from each of the computers to video-camera 100, video-camera 110 performs the process of step S211~S215 for each of the computers.

In a case where new information of resolution or frame rate is sent from a user of the computer during the transmission of image data in step S215 and S224, video-camera 110 may change the resolution or frame rate to the new one.

In this way, when the user of the computer inputs the new resolution or frame rate, the image data sent to the computer is changed in response to the input. Accordingly, the user of the computer can change the resolution or frame rate and obtain the image of the desired resolution and frame rate as desired.

As explained above, according to the first embodiment, one video-camera 110 sends image data to each of computers 120~150. In that case, the number of pixels, the number of colors and the number of frames are matched to the request from each of computers 120~150. According to this, it is possible to reduce the total data amount flowing in network 160 compared with the case where the image data is sent to the computer (receiver side) at the maximum number of pixels and maximum frame rate and the computer modifies the received image data for display. Also it is possible to reduce the internal process load of video-camera 110 and computer 120~150. Further it is possible for a user of computer to obtain a desired image quality, such as a low resolution image for display and a high resolution image for enlarging because he can set or change, as needed, the resolution and frame rate requested to video-camera 110. Accordingly, it is possible to transmit image data efficiently and to obtain a desired image quality.

Second Embodiment

Figure 5:
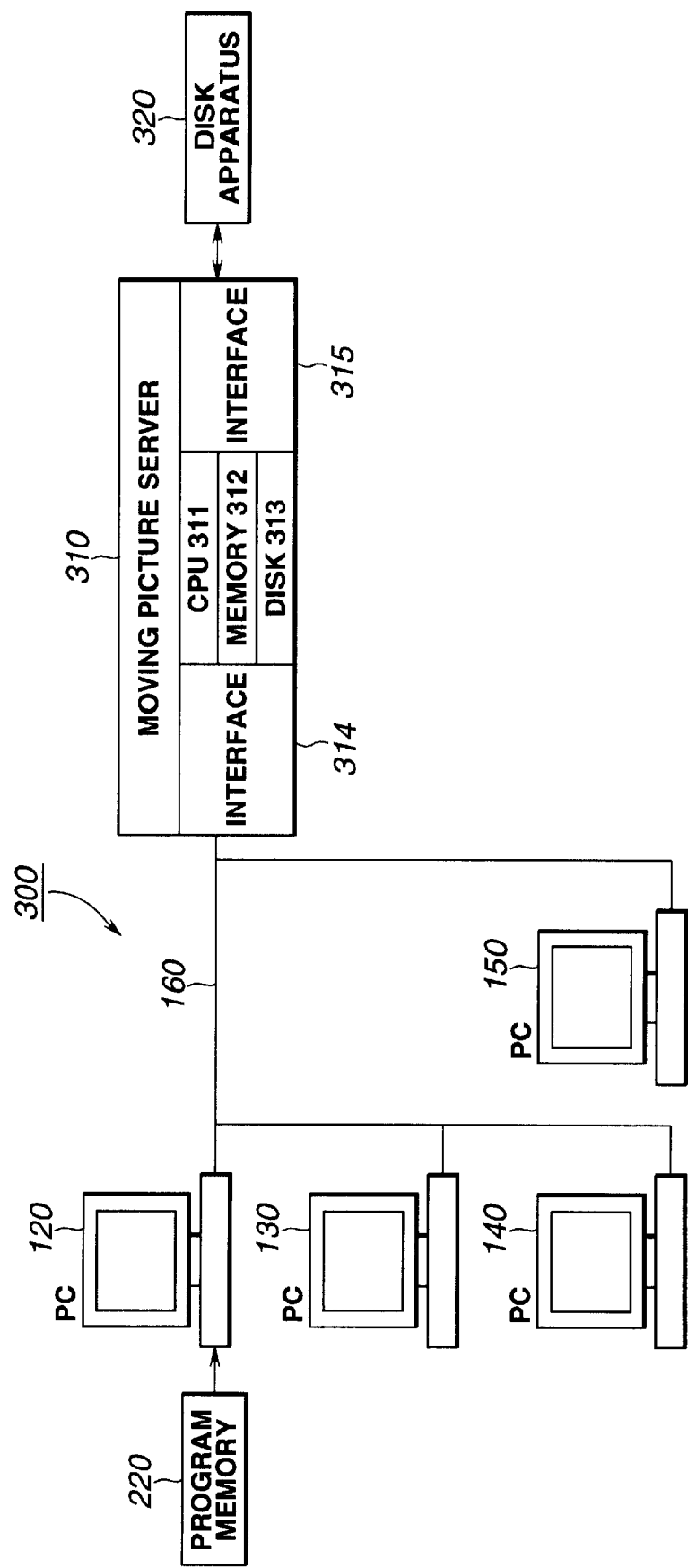
FIG. 5 shows a block diagram of the structure of a communication system according to another embodiment of the present invention.

In this embodiment, the present invention is embodied in communication system 300 shown in FIG. 5.

In communication system 300 shown in FIG. 5, the elements which have substantially the same functions as the communication system 100 shown in FIG. 1, are labeled with the same number. In communication system 300, moving picture server 310 is provided instead of video-camera 110. Disk apparatus 320 is connected to moving picture server 310.

Moving picture server 310 includes CPU 311, memory 312, hard-disk 313 for temporarily storing program and data, and interfaces 314 and 315 to network 160 and disk apparatus 320 respectively.

Disk apparatus 320 comprises an opto-magnetic disk, CDROM (Compact Disk Read Only Memory) or a large hard-disk and stores hierarchical data in a format such as that shown in FIG. 3.

In communication system 300, the hierarchical data (image data) pre-stored in disk apparatus 320 is read-out in a desired resolution and frame rate, and sent to each of the computers 120~150 by moving picture server 310 in response to the request.

In the first embodiment, one piece of image data, which is being captured in real-time by video-camera, is sent from video-camera. However, in this embodiment, a plurality of image data is pre-stored in disk apparatus 320 and each of the image data is sent in different timings in response to the request of each of computers 120~150. In particular, plural different sequences of moving picture data are stored, each with an identification by which any one of the sequences can be selected.

Concretely, a communication program is stored in a memory medium such as hard-disk 313 included in moving picture server 310. The communication program is read-out and executed by CPU 311 included in moving picture server 310 so that moving picture server 310 may communicate with each of computers 120~150.

On the other hand, a communication program is stored in a memory medium such as program memory 220 connected to computer 120. The communication program is read-out and executed by computer 120 so that computer 120 may communicate with moving picture server 310.

Other computers 130, 140, 150 also communicate with moving picture server 310 by executing corresponding communication programs.

Figure 6:
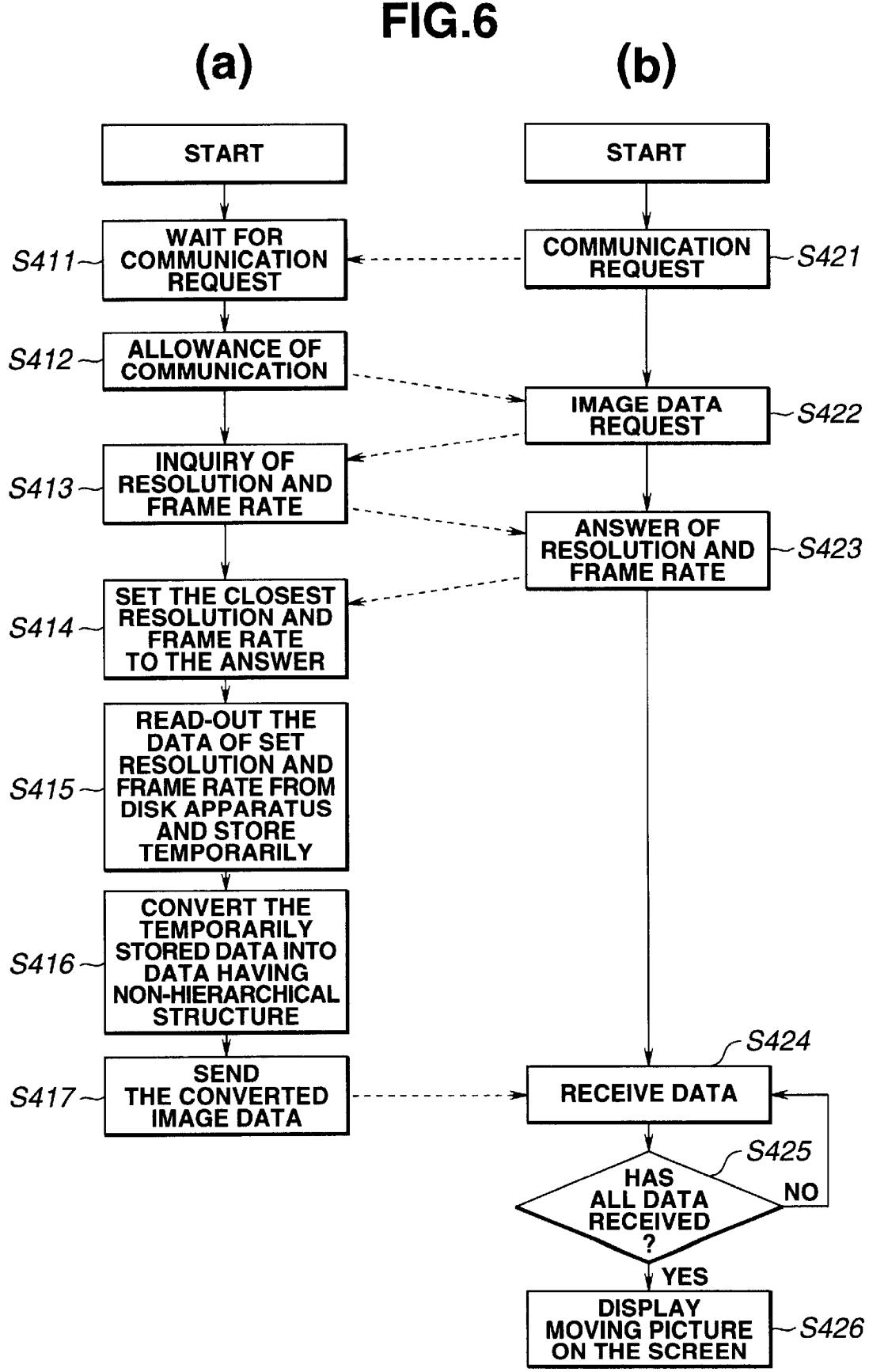
FIG. 6 is a flow-chart for explaining the operation of the communication system shown in FIG. 5.

The process steps executed by the communication program in moving picture server 310 are shown in FIG. 6(*a*). The process steps executed by the communication programs executed in each of computers 120~150 are shown in FIG. 6(*b*).

Briefly, the process steps in FIG. 6 for computer 120 operate to send an instruction to server 310 concerning resolution and/or frame rate of the moving picture data and to receive the moving picture data from server 310 at a resolution and/or frame rate based on the instruction. For server 310, the process steps operate to receive an instruction from computer 120 concerning resolution and/or frame rate of the moving picture data and to send the moving picture data to computer 120 at a resolution and/or frame rate based on the instruction from computer 120. Overall, the process operate to receive an instruction at the transmitter from the receiver concerning resolution and/or frame rate of the moving picture data to send the moving picture data from the transmitter to the receiver at a resolution and/or frame rate based on the instruction from the receiver.

In this embodiment, hard-disk 313 is provided inside of server 310 instead of video-camera 110. However, it can be connected from outside as an external memory apparatus. Likewise, program memory 220 can be located inside or outside of computer 120.

In FIG. 6, a solid line expresses a flow of control, and a dotted line expresses a flow of commands and data in network 160.

The operation of communication system 300 will be explained by using FIGS. 5 and 6.

In step S411, picture server 310 waits for a communication request. Flow remains at step S411 until server 310 receives the communication request.

In step S421, one of the computers, for example, computer 120, sends a communication request through network 160 to moving picture server 310.

Moving picture server 310 responds in step S412 by sending an allowance of communication through network 160 to computer 120.

Upon receipt of the allowance message from server 310, computer 120 sends an image data request through network 160 to moving picture server (step S422).

Next, moving picture server 310 sends an inquiry of sequence identity, resolution and frame rate of an image through network 160 to computer 120 in response to the image data request (step S413). Computer 120 responds by sending its desire for frame rate and resolution, and identification of moving picture data, through network 160 to server 310 (step S423). Computer 120 can obtain its desire for frame rate and resolution, and sequence identification, automatically such as in accordance with default values. More preferably, however, the frame rate and resolution, and sequence identity, are obtained manually, with operator interaction. For example, computer 120 can display a message for instructing a user to input information such as a size of a display area, setting values in response to the inquiry from moving picture server 310. In response to the message, the user can input information such as the size of the display area, setting values by operating a mouse or a key board. For example, a kind of an image and a size of the display area for displaying moving pictures can be input. Computer 120 sends the answer of the kind of the image, the resolution and the frame rate through network 160 to moving picture server 310 based on the operation of the user.

Next, moving picture server 310 sets the kind of the image, the nearest resolution and frame rate to the answer from computer 120 (step S414). Moving picture server 310 then reads-out only the image data, which corresponds to the set kind of image, resolution and frame rate among the image data stored in memory 320. The read-out image data is temporarily stored in internal hard disk 313 (step S415).

Moving picture server 310 converts the stored image data into image data without having the hierarchical data structure (step S416), and sends it through network 160 to computer 120 (step S417).

Next, computer 120 temporarily stores the image data without having the hierarchical data structure in internal memory (step S424).

Next, computer 120 judges whether whole image data has been received or not (step S425). Computer 120 continues to perform receiving operation of step S424 until the whole image data has been received.

After computer 120 has been received the whole image data, computer 120 displays a moving picture based on the image data stored in the internal memory (step S426).

In this example, interaction between only moving picture server 310 and computer 120 was explained. Of course, other computers 130–150 can communicate with moving picture server 310 in the same way. When a communication request is sent from each of the computers to moving picture server 310, moving picture server 310 performs the process of step S411–S415 for each of the computers.

In the above embodiment, the image data from moving picture server 310 is transmitted to computer 120, temporarily stored in computer 120, and reproduced after the whole of the image data is received by computer 120. The transmission method is called an asynchronous transmission method. However, a synchronous transmission method, in which image data of a predetermined number of frames is sent from moving picture server 310 to computer 120 in a predetermined time interval, can be used for the transmission. In that case, image display may start before computer 120 receives the whole image data.

Also, in the above embodiment, moving picture server 310 converts image data into non-hierarchical image data. However, the conversion can be performed when the image data is received by computer 120. Also, the conversion can be performed after the reception of the image data by computer 120. In this way, it is possible to reduce the process load of moving picture server 310.

Further in the above embodiment, the display based on the received image data starts after the reception of the whole image data by computer 120. However, it may start after the reception of a part of the image data, for example, image data of a predetermined time.

In this case, computer 120 does not have to wait for the reception of the whole image data. Accordingly, it is possible to shorten the time period between the start of the reception of the image data and the start of the display based on the image data. As a result, computer 120 can save on the amount of memory needed for storing the image data.

According to the second embodiment, it is possible to supply a plurality of different sequences of moving pictures to each of computers 120–150 at a plurality of different timings in addition to the effect of the first embodiment.

Because a plurality of different sequences of moving pictures are stored in disk apparatus 320 at the sender side, moving picture server 310 can send image data of preferred image sequence, number of pixels, colors and frame rate based on the request from each of computer 120–150.

Also according to this embodiment, it is possible to reduce the process load of computers 120–150. This is because the conversion to image data of non-hierarchical data structure occurs at moving picture server 310 side.

In the first and second embodiment, input image data is converted to the image data hierarchically structured both in pixel number direction (in resolution) and in time-axis direction. However, the conversion may be only in one of pixel number direction (in resolution) and in time-axis direction.

In this case, a sender side (video-camera 110 or moving picture server 310) reads all data and converts it based on the resolution and frame rate answered from a receiver side (computer 120–150).

It is preferable for the sender side to have high processing capability for conversion of resolution and frame rate, since it is easy to store moving picture data when it is stored in such as disk apparatus 320 as shown in the second embodiment. It is especially effective to use this method, in a case where moving picture data has already been produced.

In the first and second embodiment, a sender side sets the nearest value to the resolution and frame rate answered by a receiver side. However, the same resolution and frame rate as the answer can be set for the transmission.

In this case, if the resolution and frame rate of image data which is held by a sender side is completely the same as the answer from a receiver side, the sender side sends the image data as it is. On the other hand, if the answer is different, the sender side converts the image data based on the answer and sends the converted image data.

A sender side can set the nearest resolution and frame rate to the answer from a receiver side and send the image data corresponding to the set values if the receiver side can convert, before display or other processing, the received image data into the image data of the same resolution and frame rate that a use expects.

In this way, at the receiver side, a user can obtain the ideal image based on his settings. Also, is possible to re-convert the image data easily, since the image data is sent to the receiver side as the nearest form to the user's settings.

Other Embodiment

Modifications of the above embodiments are included in the scope of this invention.

The present invention can be applied to not only a system comprising a plurality of devices (for example, a plurality of computers, memory device, video-camera) as shown in FIGS. 1 and 5, but also to a single device (for example, a computer having an image capturing device).

The purpose of the present invention can be achieved by providing program codes of software for realizing the above mentioned function into a computer in the apparatus or the system connected to a various device, and making the computer (ex. CPU, MPU) in the apparatus or the system operate in accordance with the stored program, in order to realize the function of the above mentioned embodiments.

In this case, the program codes of said software themselves are used to realize the above mentioned function of the embodiment. The program codes themselves and means for supplying them to the computer, for example, the memory medium storing the program codes, comprise the invention. For example, floppy disks, hard disks, optical disks, opto-magnetic disks, CD-ROM, CD-R, magnetic tapes, non-volatile memory card, ROM can be used as the memory medium storing the program codes.

Needless to say, the above mentioned function of the embodiment can be realized not only by the computer which executes the supplied program codes but also by the computer which executes the supplied program codes together with the operating system under which the computer is operated or other application software.

Further, the supplied program codes can be stored in the memory provided in a function extension board or a function extension unit connected to the computer. After that the CPU and so on, mounted on the function extension board or the function extension unit, may execute a part of or all of the processing based on the instruction of the program codes.

While present invention is described above with respect to what is currently considered to be its preferred embodiments, it is to be understood that the invention is not limited to the disclosed embodiments. To the contrary, the invention is intended to cover various modifications and equivalent arrangements included within the spirit and scope of the appended claims.

What is claimed is:

1. Communication method for supplying moving picture data sent from a transmitter to a receiver through a transmission channel, said method comprising:

a reception step of receiving an instruction at the transmitter from the receiver concerning a resolution and frame rate of the moving picture data; and a transmission step of sending the moving picture data from the transmitter to the receiver, with a resolution and frame rate of the moving picture data being based on the instruction from the receiver.

2. Communication method according to claim 1, wherein the transmitted moving picture data is formatted hierarchically.

3. Communication method according to claim 2, wherein the transmitter transmits a part of the hierarchical moving picture data that includes a layer corresponding to the instruction from the receiver.

4. Communication method according to claim 1, wherein the transmitter transmits the moving picture data obtained from an object.

5. Communication method according to claim 1, wherein the transmitter transmits a sequence of moving picture data, which is of an identity that is based on the instruction from the receiver, from among a plurality of sequences of moving picture data.

6. Communication method according to claim 1, wherein the receiver displays an image based on the moving picture data from the transmitter.

7. Communication method for supplying moving picture data to a receiver through a transmission channel, said method comprising:

a reception step of receiving an instruction from the receiver concerning a resolution and frame rate of the moving picture data; and a transmission step of sending the moving picture data to the receiver at a resolution and frame rate based on the instruction from the receiver.

8. Communication method according to claim 7, wherein the transmitted moving picture data is formatted hierarchically.

9. Communication method according to claim 8, wherein a part of the hierarchical moving picture data includes a layer corresponding to the instruction from the receiver.

10. Communication method according to claim 7, wherein a transmitter transmits the moving picture data obtained from an object.

11. Communication method according to claim 7, wherein the moving picture data is selected, based on the instruction from the receiver, from among a plurality of sequences of moving picture data.

12. Communication method according to claim 7, wherein the receiver displays an image based on the moving picture data from a transmitter.

13. Communication method for receiving moving picture data from a transmitter to a receiver through a transmission channel, said method comprising:

a transmission step of sending an instruction to the transmitter concerning a resolution and frame rate of the moving picture data; and a reception step of receiving the moving picture data from the transmitter, with a resolution and frame rate of the moving picture data being based on the instruction.

14. Communication method according to claim 13, wherein the transmitted moving picture data is formatted hierarchically.

15. Communication method according to claim 14, wherein the transmitter transmits a part of the hierarchical moving picture data that includes a layer corresponding to the instruction.

16. Communication method according to claim 13, wherein the transmitter transmits the moving picture data obtained from an object.

17. Communication method according to claim 13, wherein the transmitter transmits the moving picture data, of which kind is based on the instruction from the receiver, from among a plurality of sequences of moving picture data.

18. Communication method according to claim 13, wherein an image is displayed based on the moving picture data from the transmitter.

19. Communication method for supplying moving picture data sent from a transmitter to a receiver through a transmission channel, said method comprising a transmission step of sending, from the transmitter, moving picture data of a predetermined resolution and frame rate based on an instruction from the receiver.

20. Communication method according to claim 19, wherein the transmitter transmits a part of the hierarchical moving picture data that includes a layer corresponding to the instruction from the receiver.

21. Communication method according to claim 19, wherein the receiver instructs a resolution or a frame rate to the transmitter.

22. Communication method according to claim 19, wherein the transmitter transmits the moving picture data obtained from an object.

23. Communication method according to claim 19, wherein the transmitter transmits the moving picture data, of which kind is based on the instruction from the receiver, from among a plurality of sequences of moving picture data.

24. Communication method according to claim 19, wherein the receiver displays an image based on the moving picture data from the transmitter.

25. Communication method between a transmitter, which produces digital moving picture data, and a receiver, which receives the digital moving picture data through a network and displays the digital moving picture data, said method comprising:
  a notification step of notifying the transmitter of a predetermined resolution and frame rate, which is set at the receiver; and
  a transmission step of supplying from the transmitter to the receiver the moving picture data of the predetermined resolution and frame rate,
    wherein the moving picture data is obtained from hierarchical data based on a notification in said notification step.

26. Communication apparatus that supplies moving picture data sent from a transmitter to receiver through a transmission channel, said apparatus comprising:
  a transmitter for transmitting moving picture data, said transmitter including an image processor for obtaining moving picture data and a transmission circuit for sending the moving picture data obtained by the image processor to a transmission channel; and
  a receiver for receiving the moving picture data transmitted by said transmitter,
    wherein the transmission circuit sends the moving picture data of a predetermined resolution and frame rate obtained from hierarchical data based on an instruction from said receiver.

27. Communication apparatus according to claim 26,
  wherein the transmission circuit includes a data generator for producing hierarchical data based on the moving picture data obtained by the image processor, and
  wherein the transmission circuit sends a part of the hierarchical data that includes a layer corresponding to the instruction from said receiver.

28. Communication apparatus according to claim 26, wherein said receiver includes an input unit for inputting a resolution or a frame rate, and said receiver instructs the resolution or the frame rate to the transmission circuit.

29. Communication apparatus according to claim 26, wherein the image processor includes an image capturing unit for taking pictures of an object and generating moving picture data.

30. Communication apparatus according to claim 26, wherein
  the image processor includes a memory for storing a plurality of sequences of moving picture data, and
  the transmission circuit sends a selected sequence of moving picture data based on the instruction from said receiver from among the plurality of sequences of moving picture data stored in the memory.

31. Communication apparatus according to claim 26, wherein said receiver includes a display unit for displaying an image based on the moving picture data from said transmitter.

32. Communication apparatus comprising:
  a transmitter for generating digital moving picture data; and
  a receiver for displaying an image based on the digital moving picture data received from the transmitter through a transmission channel, wherein
    said receiver notifies a resolution and a frame rate, which are pre-set, to said transmitter, and
    said transmitter supplies, to said receiver, the digital moving picture data of the pre-set resolution and pre-set frame rate obtained from hierarchical data based on an instruction from said receiver.

33. Communication apparatus comprising:
  a transmitter for generating digital moving picture data; and
  a receiver for displaying an image based on the digital moving picture data transmitted from said transmitter through a transmission channel, wherein
    said receiver notifies a predetermined resolution and frame rate to said transmitter, and
    said transmitter supplies, to said receiver, the digital moving picture data of the predetermined frame rate obtained from hierarchical data based on an instruction from said receiver.

34. Transmitting apparatus that sends moving picture data via a transmission channel, said apparatus comprising:
  an image processor for obtaining moving picture data; and
  a transmission circuit for sending the moving picture data to the transmission channel,
    wherein said transmission circuit sends the moving picture data of a predetermined resolution and frame rate obtained from hierarchical data based on an instruction supplied through the transmission channel from a receiver.

35. Transmitting apparatus according to claim 34, wherein said transmission circuit includes a data generator for producing hierarchical data based on the moving picture data obtained by said image processor, and wherein said transmission circuit sends a part of the hierarchical data that includes a layer corresponding to the instruction.

36. Transmitting apparatus according to claim 34, wherein said image processor includes an image capturing unit for taking pictures of an object and generating the moving picture data.

37. Transmitting apparatus according to claim 34, wherein said image processor includes a memory for storing a plurality of sequences of moving picture data, and said transmission circuit sends a selected sequence of moving picture data based on the instruction from among the plurality of sequences of moving picture data stored in the memory.

38. Receiving apparatus that receives moving picture data from a transmitter through a transmission channel, said apparatus comprising:

a command unit for instructing a predetermined resolution and frame rate to the transmitter; and a receiver for receiving the moving picture data of the predetermined resolution and frame rate obtained from hierarchical data based on an instruction by said command unit.

39. Receiving apparatus according to claim 38, wherein said receiver receives a part of the hierarchical data that includes a layer corresponding to the instruction by said command unit.

40. Receiving apparatus according to claim 38, further comprising an input unit for inputting a resolution or a frame rate, wherein said command unit instructs the resolution or the frame rate input by said input unit to the transmitter.

41. Receiving apparatus according to claim 38, wherein said receiver receives the moving picture data obtained by taking pictures of an object.

42. Receiving apparatus according to claim 38, wherein said receiver receives a selected sequence of moving picture data based on the instruction of said command unit from among a plurality of sequences of moving picture data.

43. Receiving apparatus according to claim 38, further comprising a display unit for displaying an image based on the received moving picture data.

44. A computer-executable program product stored on a computer-readable storage medium, said computer-executable program product for supplying moving picture data sent from a transmitter to a receiver through a transmission channel, said computer-executable program product comprising:

computer-readable program code for receiving an instruction at the transmitter from the receiver concerning a resolution and frame rate of the moving picture data; and computer-readable program code for sending the moving picture data from the transmitter to the receiver at a resolution and frame rate based on the instruction from the receiver.

45. A computer-executable program product stored on a computer-readable storage medium, said computer-executable program product for supplying moving picture data to a receiver through a transmission channel, said computer-executable program product comprising:

computer-readable program code for receiving an instruction from the receiver concerning a resolution and frame rate of the moving picture data; and computer-readable program code for sending the moving picture data to the receiver at a resolution and frame rate based on the instruction from the receiver.

46. A computer-executable program product stored on a computer-readable medium, said computer-executable program product for receiving, at a receiver, moving picture data transmitted from a transmitter through a transmission channel, said computer-executable program product including:

computer-readable program code for sending an instruction to the transmitter concerning a resolution and frame rate of the moving picture data; and computer-readable program code for receiving the moving picture data from the transmitter at a resolution and frame rate based on the instruction.

* * * * *

UNITED STATES PATENT AND TRADEMARK OFFICE
CERTIFICATE OF CORRECTION

PATENT NO.    : 6,445,824 B2
DATED         : September 3, 2002
INVENTOR(S)   : Teruo Hieda It is certified that error appears in the above-identified patent and that said Letters Patent is hereby corrected as shown below:

<u>Title page,</u>
Item [*], insert:
-- [*] Notice:   This patent issued on a continued prosecution application filed under 37 CFR 1.53(d), and is subject to the twenty year patent term provisions of 35 U.S.C. 154(a)(2). --.

Signed and Sealed this

Twenty-fifth Day of February, 2003

JAMES E. ROGAN
*Director of the United States Patent and Trademark Office*